May 13, 1941.  F. B. ROMBERG  2,241,737
METHOD OF AND APPARATUS FOR DETACHING AND
SEPARATING NUT MEATS FROM SHELLS
Filed Nov. 8, 1939

INVENTOR.
Felix B. Romberg

Patented May 13, 1941

2,241,737

UNITED STATES PATENT OFFICE 2,241,737

METHOD OF AND APPARATUS FOR DETACHING AND SEPARATING NUT MEATS FROM SHELLS

Felix B. Romberg, Holland, Tex.

Application November 8, 1939, Serial No. 303,484

39 Claims. (Cl. 209—3)

This invention relates to a novel and improved process of and apparatus for detaching and separating the meats and shells of cracked nuts from each other, and includes improvements for separating detached meats from shells and also improvements for releasing and detaching nut meats from shells.

One object of this invention is to provide a method and an apparatus by means of which the basic process for separating nut meats from shells disclosed by my pending application 236,602 may be carried out continuously.

Another object is to provide a method and an apparatus by means of which enclosed and adherent nut meats may be released and detached from the shells of cracked nuts with minimum injury to the nut meats from the releasing and detaching forces.

Still another object of the invention is to provide a method and apparatus ensuring efficiency, cleanliness, simplicity, economy and large capacity automatic operation in the treatment action.

Additional objects and advantages will appear in the course of the following description, reference being had to the accompanying drawing showing one form of apparatus for carrying my invention into practice and in which.

The present invention may be employed with various species of nuts but will here be described as it is applied to pecans, except where specific reference is made to Persian (California) walnuts.

The first part of the detailed description of this specification deals with a siphon conduit and associated parts, through which water containing meats and shells to be separated is passed to subject the shells to sub-atmospheric pressure and then to return them to atmospheric pressure while they are in water, thereby to force water into the porous tissue of the shells so that the shells become of greater density. Thereafter, means is described for separating out the detached meats, delivering an impact to the shells still containing enclosed or attached meats to thereby release additional meats, and alternately repeating the separating and delivering of impact actions, with each impact preferably more violent than the preceding one, until all of the meats have been released and separated from the shells.

Figures 1, 2, 3:
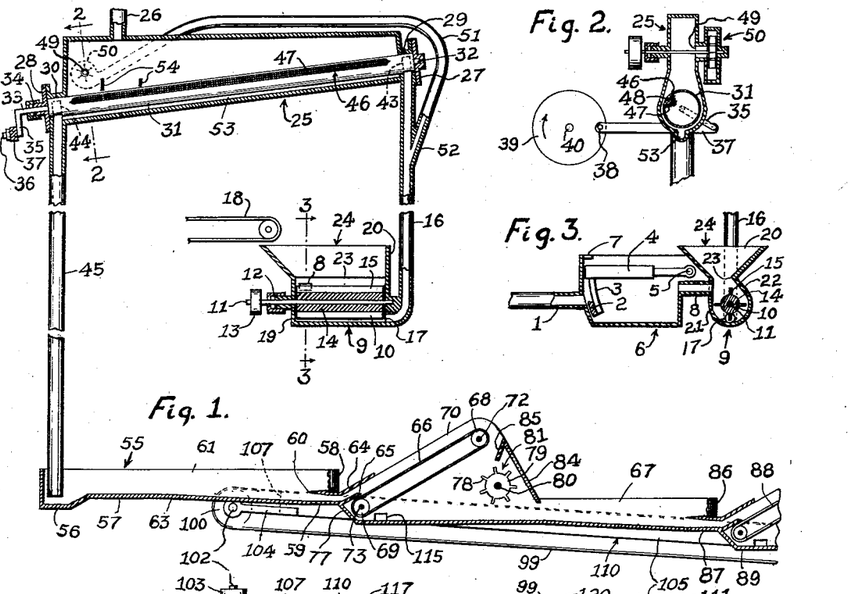
Fig. 1 is a fragmentary vertical longitudinal section through the apparatus.
Fig. 2 is an enlarged cross section taken on the line 2—2 of Fig. 1 and looking in the direction of the arrows.
Fig. 3 is a cross section taken on line 3—3 of Fig. 1 and looking in the direction of the arrows.

The present apparatus uses a large volume of water which is supplied by a supply pipe 1 (see Fig. 3) as regulated by a float valve 2 which is secured by an arm 3 to a float 4 hingedly secured at 5 in a float tank 6 which has a stop 7 for limiting the extreme height of the float. The float valve stabilizes the height of the water in the float chamber from which the water flows through a short tube 8 into the elongated feed basin 9 (Figs. 1 and 3). The cross-sectional area of tube 8 is sufficiently large to keep the water level in the feed basin substantially the same as that in the float chamber.

In the feed basin is an agitator 10 comprising a shaft 11 passing through one end of the basin at the stuffing box 12, carrying a pulley 13 and journaled at each end of the feed basin. Inside the feed basin the agitator is further comprised of a drum 14 secured to the shaft and of blades 15 secured radially to the periphery of the drum. The drum and its blades extend substantially the entire length of the feed basin.

The connecting tube 8 enters the feed basin from one side at substantially one end of the basin and the upflow tube 16 of the siphon communicates with the other end of the basin through an opening 17 which extends from the elevation of the bottom of the drum 14 to the elevation of the bottom of the interior of the basin, the drum being spaced from the bottom of the basin to provide just sufficient space for the opening 17.

The float valve 2 in the float chamber maintains the water level in the feed basin at approximately the highest elevation reached by the blades of the agitator during rotation of the agitator. Cracked nuts or nut meats and shells, with or without previous handling, are delivered to the feed basin preferably in a uniform stream by any suitable conveyor 18 which discharges this solid material at that end of the basin where the water inlet tube 8 is located. The drum is rotated in a direction tending to carry water away from the inlet tube.

The end walls 19 and 20 of the elongated feed basin are in perpendicular planes with respect to the axis of the agitator to an elevation above the ordinary water level in the basin. The bottom wall and the lower portions of the side walls of the basin are curved about the path of the agitator blades while that side 21 of the basin along which the agitator rotates upwardly may be vertical from the elevation of the axis of the agitator to a horizontal plane above the wetted portion of the basin. That other side wall 22 of the basin along which the agitator rotates downwardly is, however, preferably curved to an elevation above that of the axis of the agitator and extended thence tangentially to a point 23 approximately directly above the axis of the agitator and above the wetted portion of the basin. Above the wetted portion of the basin the side walls and outer end wall may extend outwardly to form an enlarged opening 24 between them.

With the side walls of the feed basin thus constructed, water entering through the connecting tube 8 is whirled with the rotating agitator in the basin without incorporating air as it flows through the length of the basin to the opening 17 of the upflow pipe 16. And, whereas the meats and many of the shells would ordinarily float at the top of quiet water, these lighter elements become drawn down into the water in the basin, owing to the rotary movement of the water and the inclination of the side wall 22 against which these elements are driven by the rotating water. Rotation of the water by the agitator 10 thus causes the meats and shells to be carried forward spirally about and with it to opening 17 of the upflow pipe 16, during which movement of the water, meats and shells the meats and shells become dispersed in the water and air is freed from the shells and rises in the form of bubbles from the shells and escapes into the atmosphere. The path of movement of the blades of the agitator is immediately in front of the opening 17, which prevents stoppage of the opening. The drum and its location immediately above the elevation of the opening prevents accumulation of material toward the center of rotation.

The upflow pipe 16 extends to an elongated air-removing or vacuumizing tank 25 (Figs. 1 and 2) which is constructed strong enough to resist the pressure of the atmosphere. From the top of this tank air is withdrawn through the suction tube 26 which communicates with any suitable vacuum pump of ample capacity. (Not shown.)

At opposite ends the air-removing tank has removable heads 27 and 28, respectively, which fit airtight and may be secured in place by any suitable means. Adjacent and within these heads the tank is provided with bores 29 and 30 to receive opposite ends of an oscillating separator tube 31 arranged in an inclined position adjacent the bottom of the tank with a loose fit. This tube is carried by the aforesaid heads, having at its upper end a concentric stud shaft 32 (Figs. 1 and 7) which is journaled in the head 27 and having at its lower end a longer concentric shaft 33 which is journaled in the head 28 and passes through any suitable stuffing box 34 at that head. To shaft 33 is secured a crank 35 which has a crank pin 36 which is connected by a rod 37 to a crank pin 38 (Fig. 2) of a rotatable wheel 39 carried by a shaft 40 which is held in fixed rotative position by and rotated by any suitable means. The parts are so proportioned that rotation of the wheel 39 causes the tube 31 to oscillate on its axis for an angular distance of, for instance, 120 degrees.

The ends of the oscillating tube 31 are sealed by cross walls as shown at 41 (Fig. 7), which cross walls support the shafts 32 and 33 respectively. Adjacent these cross walls the body walls of the tube are slotted semi-circumferentially, or as suitable, at 43 and 44 respectively. These slots are covered by the walls of the bores 29 and 30, respectively, except that the slot 43 at the upper end leaves the opening to the upflow pipe 16 uncovered by the side wall of the tube 31 during its oscillation, while the slot 44 at the lower end of the tube similarly leaves the opening to the downflow pipe 45 uncovered. Thus the upflow pipe, oscillating tube and downflow pipe provide a continuous flow channel for water and the meats and shells it carries. The bore of the oscillating tube is of larger cross-sectional area than that of the upflow and downflow pipes, hence the velocity of flow is considerably less in the oscillating tube than in said pipes.

Figures 5, 6, 7, 8:
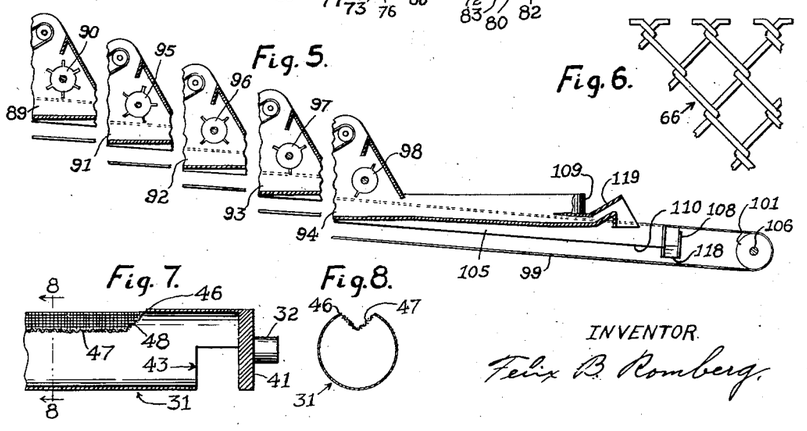
Fig. 5 is a continuation of parts of the apparatus shown in Fig. 1, fragmentarily showing additional separating troughs with their beaters.
Fig. 6 is an enlarged detail fragmentary plan view showing the construction of a type of perforated belt which may be used in the apparatus.
Fig. 7 is an enlarged longitudinal section of the entrance end of the oscillating tube, taken on a plane through the apex of the fold of the perforated screen and the axis of the tube.
Fig. 8 is a cross section of the oscillating tube taken on the line 8—8 of Fig. 7.

Longitudinally intermediate of the slots 43 and 44 and along the normally upper side of the tube is an elongated slot 46 (Figs. 1, 2, 7 and 8). Into this slot is fitted a perforated screen 47 which extends into the interior of the tube about half way to its axis in the form of a broad V. The sides of this screen are secured in any suitable manner to the side walls of the tube. At their ends the folds or wings of the perforated screen do not terminate abruptly but are diagonally cut away, as indicated at 48 (Fig. 7). The perforated screen 47 keeps the meats and shells in the tube 31 but permits air to pass through.

Above the slot 46 of tube 31 the air removing tank 25 is deep to provide a vacuum space above the water in the tank. The top water level in the tank is fixed by the overflow opening 49 in the wall of the tank (Figs. 1 and 2), which opening leads to the centrifugal pump 50 by means of which all water overflowing through opening 49 is driven through the pipe 51 which returns this water to the upflow pipe, discharging it in a sharply downward direction at 52. The downward force of this discharged water retards the rate at which water flows upward in pipe 16. When not thus retarded, the upflow of water in pipe 16 is slightly greater in volume than the downflow in pipe 45, for reasons hereinafter set forth. The water level in the air removing tank is therefore automatically maintained at the opening 49. The elevation of this opening is intermediate that of the upper and lower ends of the oscillating tube 31, so that the upper end of tube 31 is above the water line in tank 25, and the lower end is below it. In the submerged part of the tube the perforated screen 47 agitates the buoyant meats and shells and removes air bubbles from them and the water as the tube is oscillated.

It is desirable that the opening 49 in the centrifugal pump be near that end of the tank toward which the water flows in the tube 31 so that floating scum will not accumulate in the tank. Most of such small solid particles as pass through the screen 47 will float at the top of the water in the tank and will be removed through this opening, but some will sink and for this reason a small channel 53 is provided in the tank 25 below tube 31 for the discharge from the tank of such portions of the scum. This channel opens into and discharges into the downflow pipe 45.

Between the bores 29 and 30 sufficient clearance is provided between the walls of the air-removing tank and the side walls of the tube 31 to permit the passage of fine solid material downward to the channel 53. The channel 53 and the space between the adjacent side walls of the air-removing tube 31 are made small in cross-sectional area to prevent any considerable volume of water from therethrough by-passing the lower extremity of tube 31. Means may also be provided to check by-passing above the tube, this being in the nature of baffles 54 extending laterally across the tank above the tube 31. These baffles are located below the elevation of the overflow opening 49 so that they will not obstruct the flow of floating scum toward this opening.

The upflow pipe 16, air-removing tank 25 and downflow pipe 45 constitute a siphon conduit which conveys water and suspended meats and shells from the feed basin 9 to the separating trough 55 into which pipe 45 empties. The pipes and all openings through which the meats and shells pass are of proper diameter and the velocity of flow therethrough is sufficient to prevent clogging. I prefer to make the upflow and downflow pipes about three inches in internal diameter. The upflow and downflow pipes are vertical to keep the solid material distributed in the water and to prevent injury to the meats by their rubbing against the walls of these pipes.

I prefer to maintain an absolute pressure of about three-fourths of one pound per square inch above the water in the air removing or vacuumizing tank 25. This means that for an elevation of 400 feet above sea level the difference between the mean atmospheric pressure and the air pressure in tank 25 is equivalent to the pressure of a column of water about thirty-two feet high. Under these conditions the vertical distance between the water level in the separating trough 55 and the overflow opening 49 at the water line of tank 25 may be approximately thirty-five feet, to leave a net head of three feet for overcoming hydraulic resistance due to downflow. Under the same conditions the vertical distance between the water level in feed basin 9 and the summit of the siphon may be about 27½ feet, to provide the equivalent of 4½ feet of head for overcoming hydraulic resistance due to upflow. This provides 1½ feet more net head for the production of upflow than for the production of downflow, at mean atmospheric pressure. On a day when the atmospheric pressure is low the surplus may be increased to 2½ feet, while on a day when the atmospheric pressure is high the surplus may be reduced to ½ foot. But whether the surplus be 1½, 2½ or ½ feet, the water will tend to flow into the air removing tank faster than it discharges through the downflow pipe, so that there will be surplus water to overflow into the centrifugal pump and return through pipe 51, assuming that the coefficient of friction is not greater on the upflow side of the siphon than on the downflow side and that the suction pressure in the air-removing tank remains substantially constant.

Since the return of overflow water through pipe 51 stabilizes the rate of upflow, the rate of flow through the siphon varies directly as the square root of the head that is available for overcoming the resistance of downflow. If this head is three feet at mean atmospheric pressure for the altitude, then changes in weather will cause it to vary from 2½ feet to 3½ feet. This means that if the velocity of the water through pipe 45 is five feet per second on a day of high atmospheric pressure it will be about six feet per second on a day of low atmospheric pressure.

The proper net upflow and downflow heights for the siphon will of course depend on the altitude of the location, the absolute pressure to be maintained at the summit of the siphon, the diameter and smoothness of the bore of the upflow and downflow pipes and oscillating tube, the curves, openings and obstructions to flow encountered in the siphon, the velocity of flow that is desired along the different sections of the siphon, and other factors. By considering such factors in the light of well known engineering principles, those skilled in the art will be able to construct and operate such a siphon.

While some suitable means is preferably employed to govern the speed of the vacuum pump so as to maintain a constant suction pressure in the air removing tank 25, the same result may be achieved by using a vacuum pump operating with surplus displacement. Such a pump will keep the suction pressure at or near the vapor pressure of the water since small increases in absolute pressure at such a degree of vacuum are offset by a much increased volume of exhaustable air and vapor.

As the shells are carried down the downflow pipe 45 by the water, the hydrostatic pressure of the water increases, forcing it into the porous portions of the shells so that upon arrival in trough 55 all the pieces of detached pecan shells tend to sink in the water. Detached pecan meats tend to float in the trough, but the treated meats have only a small margin of buoyancy in water so that pieces of meat which are partly or wholly surrounded by shell will sink. Even a relatively small proportion of flinty shell will overcome the buoyancy of the meat when the two are combined and will cause the combined mass to sink. While some of the detached meats of pecans sometimes sink in water, this phenomenon occurs chiefly with small pieces of meats that are largely skin and with old dry meats. With fresh and properly stored pecans the proportion of detached meats that sink in water is negligible.

At the distant end from where the downflow pipe enters it, the trough 55 terminates with two spouts 58 and 59 arranged respectively above and below the level of a divider 60 which extends horizontally across the trough between its side walls 61 and 62 at an elevation below the water line of the trough. The top spout, or meat spout, 58 is open at the top whereas spout 59 is closed at the top. The divider 60 forms the floor of spout 58 and also the roof of spout 59, being forked where these two spouts separate. Spout 58 leads to one side and empties at some distance from spout 59. It conveys from the trough the upper portion of the trough water after this water passes the divider. In this upper water the detached meats of pecans float. The side walls of spout 58 are a continuation of the side walls 61 and 62 of the trough above the divider 60 while the side walls of spout 59 are a continuation of the side walls 61 and 62, below the divider. The bottom of spout 59 is a continuation of the floor 63 of the trough. The spout 59 conveys forward that part of the trough water which passes below the divider 60, together with the solid material carried therein. This solid material comprises meat free shells and shells with meats attached thereto or enclosed therein. Spout 59 has an upturned section 64 leading to an outlet where water overflows at 65 which is at an elevation so that about three fourths of the water flowing through trough 55 will overflow through spout 59 and the remaining one fourth will overflow through spout 58.

The trough 55 is of such length that proper vertical separation of the buoyant and non-buoyant materials are effected before they are carried past the divider 60. To facilitate this stratification the trough is relatively wide at the end where the downflow pipe 45 enters and becomes narrower and deeper toward the divider 60 so that the water is deepest at the divider but retains approximately the same cross-sectional area and hence approximately the same rate of flow. Between the divider and the upturned section 64 the cross-sectional area of spout 59 becomes smaller due to a decrease in depth, thus causing an increase in rate of flow to force solid material up section 64 which likewise has the smaller cross-sectional area.

*Recovering the remaining meats*

The spout 59 widens toward its outlet 65 to spread the solid material upon an inclined perforated endless belt 66 through which the water passes into the interior of a second separating trough 67.

Figure 4:
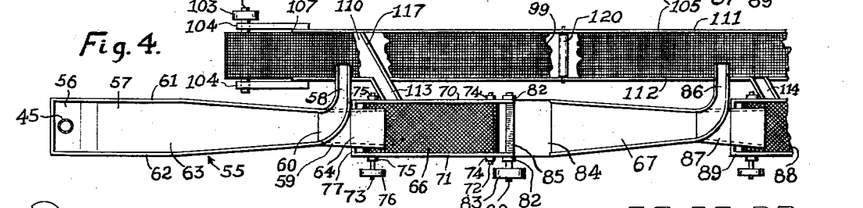
Fig. 4 is a plan view of that part of the apparatus which lies below the level of the feed basin, with portions of belt 99 cut away to show parts beneath it.

The belt 66 is mounted about rollers 68 and 69 which are mounted between vertical side walls 70 and 71 of trough 67 and are fixedly secured to shafts 72 and 73 which are respectively mounted in journal boxes 74 and 75 (Fig. 4) carried by the side walls. One of the shafts carries a pulley 76 suitable for actuating the same and thus driving the belt 66. The perforated belt 66 may be of any suitable material and construction for straining the water and fine shell particles from those shell portions which are large enough to contain or carry pieces of meats. There are various types of construction that are suitable for this purpose, but I prefer a link type wire belt (Fig. 6) in which the individual wires all have the form of a laterally flattened corkscrew and extend across the belt in the transverse direction, passing over and under each of the adjacent wires at each coil thereof.

The belt 66 is mounted close under the outlet 65 of spout 59 to catch all the coarse solid material, and the lower roller 69 is mounted below the elevation of the outlet point 65 to permit the water to flow by gravity through the belt and over the roller into the trough 67 which begins at 77 beneath the delivery end of spout 59 and encloses roller 69. The belt is inclined at such an angle that the material deposited on it will be elevated by the upward movement of the upper belt length and thus carried over the top roller 68.

The solid material is discharged by the belt 66 over the summit of roller 68 and then drops into the path of blades 78 secured radially to the periphery of a cylindrical drum 79 fixedly secured to a shaft 80. The blades, drum and shaft constitute a rotary beater 81. Shaft 80 is journaled in journal boxes 82 secured to the side walls of the trough and carries a pulley 83 beyond one of the journal boxes. The drum and radial blades extend substantially from wall to wall between the vertical walls of the trough and are located where, in operation, the blades strike the falling shells after they have dropped about a foot from the belt 66 and after the blades have traveled through about one fourth of the angular distance from the highest to the lowest position of their circular movement, from which point the blades drive the shells into the water of the trough 67 below the belt 66. On the other side of the beater from the belt is a guard plate 84 which extends between and is secured to the side walls 70 and 71. From the upper end of this plate a guide plate 85 extends downwardly at a steep forward inclination to form a guide for material falling from the belt 66 to the beater.

Beyond the guard 84 from the beater the second separating trough 67 is identical in construction and operation to the last part of the first separating trough 55. A top spout 86 conveys the upper portion of the water of the trough to one side, together with the detached meats floating on the surface of the water, and a bottom spout 87 conveys the lower portion of the water, together with the therein contained solids, to the perforated belt 88 of a third separating trough 89. The third trough has a beater 90 (Fig. 5) and following this trough are additional separating troughs 91, 92, 93 and 94 with the respective beaters 95, 96, 97 and 98.

It will be noted that the beater 81 of the second separating trough is the first beater of a series of beaters. The first beater is revolved at a moderate rate of speed and each succeeding beater of the series is revolved faster than the preceding one in the series and delivers a greater impact to the material dropped into the path of its radial blades, the last beater having such a speed and delivering such shell shattering impact as to release any meats that may have remained locked in the shells through the previous beating operations.

In this connection it will be noted that as the shells pass from trough to trough all the previously detached meats are separated before the shells are struck the next blow, so that no meat is struck by a beater after it has become detached from the shell. This reduces damage to meats because, as observation has shown, meats are not ordinarily damaged while still enclosed in shell pieces, but are damaged if struck, rubbed or squeezed after they are liberated from the shell.

This invention is based on the principle derived from practical observation that when pecans are cracked some of the meats are thereby released from shell attachment, some of the remaining pieces of the meat can be released by one or more light to moderate jarring impacts, while the pieces of meat which are not released by this type of jarring can be released by one or more intense shell shattering impacts. In my invention the meats which are already released are separated in the first separating trough, the meats most difficult to release are released and separated by the last troughs and their beaters, and meats yielding to impact of intermediate intensity but not light intensity are released and separated by the intermediate trough units of the series. By this process minimum damage is done to the meats and their recovery is complete.

Other things being the same, the circumferential spacing of the blades of the beaters is preferably approximately directly proportional to the speed at which these beaters rotate. Hence, if all the beaters are of the same diameter, the number of blades in each beater is preferably approximately inversely proportional to the speed at which that beater rotates. Therefore, the first beater 81 is illustrated with seven blades whereas the last beater 98 is illustrated with two blades. For simplicity I have presented only six beaters in the drawing, one beater for each number of blades from seven to two. It will be understood that as many beaters as desired may be used and that two or more beaters with the same number of blades and the same rotative speed may be employed in succession, each with a separating trough, before the next faster beater with less blades is employed.

I prefer to make the depth of the blades about one-fourth the diameter of the drum of the beater. One advantage of short blades and a large drum is that the air is stirred less by the blades. Another advantage is that different shell pieces are struck blows of more nearly the same intensity. However, the shells should preferably not fall on the drum before a blade strikes them.

The blades of each beater should strike individual shell pieces instead of bunches of shell pieces. That is to say, one piece of shell should not strike upon another when it is struck by a beater blade. This object is accomplished in part by moving the belt 66 fast enough to keep the shells finely spread and by bringing the shells into the path of the beater at considerable velocity, as by dropping the meats from a point well above the point where it is struck by the beater. The width of belt 66 and of the spout outlet 65 are also factors affecting this result, as is the proportion of shells in the conveying water. The belt 66 is preferably of such mesh that material too fine to contain attached meats will pass through the belt with the water rather than be fed to the next beater.

All the separating troughs are preferably in a line, with each succeeding trough a few inches lower than the preceding one so that the water will flow into each trough by gravity. With this arrangement all the top spouts, or meat delivering spouts, of the separating troughs terminate in a line and empty on an endless perforated fabric belt 99 mounted about rollers 100 (Fig. 1) and 101 (Fig. 5). Roller 100 is fixedly secured to a shaft 102 which carries a pulley 103 and may be journaled in arms 104 of the pan 105. Roller 101 is mounted on a shaft 106 which may be mounted in any suitable manner.

The pan 105 extends from 107 in front of the first meat spout 58 to 108 behind the last meat spout 109. It is comprised of a flat bottom, or floor 110, vertical side walls 111 and 112 and spouts such as 113 and 114 which return water from the pan to openings in the side walls of adjacent troughs, such as opening 115 in trough 67. The forward side wall of each of these diagonal spouts continues as a partition 117 diagonally across the pan to intercept the water running down the pan and divert it into the spout. The vertical side wall 112 is omitted where the spout merges from the pan, to provide communication between the spout and the interior of the pan.

Thus the water from each meat spout drains through the perforated fabric belt into the pan and is returned to the next trough of the series by the diagonal interceptor 117 and spout. There is also a spout 118 at the lowest end of the pan (Fig. 5). This is located close to the bottom spout 119 of the last trough of the series so that the streams of water from spouts 118 and 119 may be united handily.

The side walls 111 and 112 of the pan may extend upward far enough to enclose and guide the sides of the meat conveying belt 99, and may also serve to support shafts on which rollers 120 are rotatably mounted to support the top length of the meat belt. Similar rollers may support the return length of the meat belt below the pan.

The meat conveyor belt may be driven in either direction according to where the meats are to be delivered, but I prefer to deliver them at the lower end of the pan and to drive the belt at a speed corresponding to the rate at which shells travel through the series of separating troughs, so that it is possible to feed successive batches of cracked nuts through the apparatus in close succession and have the meats of each batch delivered substantially separately by the meat belt regardless of the separation of the meat over a considerable length of separating troughs.

It is desirable to locate shelling plants employing the present invention at places where there is abundant cheap water, but where water represents a considerable expense the water discharged at spouts 118 and 119 may be reconditioned by straining and filtering and used again.

Where the shelling plant is in a two story building the feeding basin 9 is conveniently located on the second floor, the separating troughs on the first floor and the siphon projected above the roof where it ordinarily requires protection against freezing temperature. The exact arrangement of parts of the apparatus may be varied considerably to suit the building where nuts are shelled.

Operation

For pecan nuts the operation of my invention is as follows:

Any suitable flat plate is temporarily placed across the lower end of the downflow pipe 45 and some water is poured into the trough 55 to cover this plate with water and thus seal the end of the pipe completely against the entrance of air. Water is then allowed to run from the supply pipe 1 through the float chamber and into the feed basin 9, and power is turned on for the operation of all parts of the apparatus except the conveyor 18. The vacuum pump now exhausts the air from tank 25 through the suction tube 26 and the water rises in the upflow pipe 16 and overflows into tube 31 and down into the downflow pipe 45. When the head of water in pipe 45 becomes about 32 feet the pressure in pipe 45 releases the temporary plate under the lower end of the pipe from suction against the pipe and this plate is withdrawn manually and removed from the trough.

At this time water still flows up pipe 16 faster than it discharges from pipe 45 so that pipe 45 is completely filled with water and the tank 25 is filled with water until the water line reaches the overflow opening 49 and overflows into the centrifugal pump 50. The water level is then stabilized along the opening 49 because of the return of water through the pump and pipe 51 and its downward discharge into the upflow pipe 16 to retard the upward flow in pipe 16.

After the temporary plate has been removed from the bottom of the pipe 45, water begins to fill and flow through trough 55 and rapidly advances through and fills the succeeding troughs of the series, the flow out of each trough being through its spouts.

The conveyor 18 is now put in operation and delivers a stream of cracked nuts or meats and shells to the feed basin 9 where these are mixed with the water of the basin by the rotation of the agitator 10. They are then carried in the water into and up the upflow pipe 16, through the oscillating tube 31 and down the downflow pipe 45 into the separating trough 55. As they are carried up the upflow pipe 16 the pressure of the water about them becomes less than the pressure of the atmosphere and continues to decrease until they reach tube 31 where the pressure is about one twentieth that of the atmosphere, or as may be desired. This reduction in pressure causes the air in the porous portions of the shell to expand manyfold and appear as bubbles. The larger bubbles escape from the water in that region of the tube 31 which is above the waterline in tank 25. The meats and shells are buoyant in the water in the tube and rise into the path of movement of the perforated screen 47 where they are struck by the screen which oscillates with the tube. Air bubbles that cling to the meats and shells are screened out by this beating action of the perforated screen and rise through its V-shaped fold to the surface of the water. The meats and shells are thus thoroughly de-aerated in the oscillated tube 31. This air is exhausted through the suction tube 26.

As the de-aerated shells pass down the downflow pipe 45 the pressure of the surrounding water increases on them, forcing water into the porous shell portions and other spaces formerly filled with air at atmospheric pressure, but in which air was rarefied at the summit of the siphon. So when they arrive in trough 55 the shells are water filled, are considerably denser than water and have wet surfaces externally and within the pores. The pecan meats, however, remain less dense than water, with minor exceptions as previously noted. Moreover, the density of water is not midway between that of meats and saturated shells, but much nearer that of the meats so that only detached meats will float in the water. Meats attached to shells will sink with them and all empty shells will sink. This separation of the solid materials into surface and bottom streams takes place as the water flows forward in trough 55 and the floating meats are poured off through the upper spout 58 while the materials of the bottom stream of water are carried through spout 59 and deposited on the perforated belt 66 through which the carrying water passes with small pieces of solids not large enough to contain both meat and shell. The belt carries the deposited material over the top roller 68 and drops it upon the rotating beater 81 which strikes each particle of dropping matter a single blow and therewith drives it into the water below belt 66, which includes the water which has passed through the belt from spout 59 and is now flowing through trough 67 in which beater 81 is mounted. The water that was discharged by spout 58 also flows through trough 67, it having drained through the meat conveyor belt 99 into the pan 105 and been returned by the diagonal spout 113 through the opening 115 in the side wall of the trough.

The material again undergoes gravitational separation in the water of trough 67 and the fraction which sinks is passed through additional beating and separating operations at additional trough units 91 to 94, until all the meats have been released from the shells and separated, to which end each succeeding beater rotates more rapidly than the preceding beater of the series, the last beater striking with extreme violence so as to release any remaining pieces of meats from the shells.

At each succeeding trough the meats separated are delivered to the perforated belt 99 by a top spout 58, etc., from which belt the water drains into the pan 105 and is returned to the next succeeding separating trough of the series in the same manner as it was returned from the first meat spout 58 to the second trough 67 via the diagonal spout 113. The meats are discharged at one end of the conveyor 99 and may then be dried immediately or first passed through another siphon and separating trough for recleaning or may be handled in any manner desired.

In operating on cracked Persian walnuts a separating medium of greater density than water is necessary since some of the meats have a density greater than water. Accordingly, the apparatus and its operation may be generally the same as described for pecans, except that after the meats and shells have passed through the siphon and before they are passed through the series of separating troughs the meats and shells are removed from the water that has carried them through the siphon and are transferred to brine of suitable density which is used as the liquid medium in the separating troughs.

One more peculiarity met with in operating on Persian walnuts is that several minutes are required for water to flow into some pores after the air has been removed. Owing to the fact that water is much denser and more viscous than air, the water requires much more time to fill minute pores than is required to draw the air out of such pores. If the mass of Persian (California) walnut meats and shells is passed through the series of separating troughs without an interval of soaking subsequent to their passage through the siphon, some pieces of empty shell and some shells containing meat will float in the brine and be discharged by belt 99 along with the detached meats. These pieces of shell may then be separated from the detached meats by soaking the material in water for about ten minutes immediately after it is discharged by belt 99 and then transferring the soaked material to a bath of brine. The shells which sink in this brine can then be returned to trough 55 and be re-run through the series of troughs and their beaters for recovery of any unreleased meats.

What I claim is:

1. The method of detaching and separating meats from shells of cracked nuts, which consists in immersing the shells in an aqueous liquid, removing the saturated shells from the liquid and discharging them unsupported into the air and while they are unsupported in the air striking them to detach meats therefrom, and thereafter immersing the shells and detached meats in an aqueous liquid of intermediate density and allowing them to separate therein.

2. The method of detaching and separating meats from shells of cracked nuts, which consists in immersing the shells in an aqueous liquid, removing the saturated shells from the liquid and discharging them into the air and while they are unsupported in the air repeatedly striking them to detach meats therefrom with a striking force increasing in intensity with repetition, and each time the shells have been struck removing detached meats from the shells by immersing the shells and detached meats in an aqueous liquid of intermediate density and allowing them to separate therein.

3. The method of detaching and separating meats from shells of cracked nuts, which consists in saturating the shells in an aqueous liquid, discharging the saturated shells unsupported into the air and while they are unsupported in the air striking them to detach meats therefrom and forcing them and the detached meats directly into an aqueous separating liquid of intermediate density, and allowing the shells and detached meats to separate in said separating liquid.

4. The method of detaching and separating meats from meat carrying shells of cracked nuts having porous tissue which consists in immersing the meat carrying shells of the cracked nuts in an aqueous liquid, subjecting the meat carrying shells to an increase in hydrostatic pressure by the liquid to a degree where the liquid is forced into the porous tissue of the shells and renders the shells denser than the carried meats, repeatedly discharging the treated shells unsupported into the air and while they are unsupported in the air striking them to detach meats, and each time after the shells have thus been struck removing detached meats from the shells by immersing the shells and meats in an aqueous liquid of intermediate density and allowing them to separate.

5. The method of separating detached fatty nut meats from shells of cracked nuts mixed therewith, including shell pieces which contain porous tissue and will not sink before treatment, in a chosen aqueous separating liquid in which the meats will float, which consists in introducing the mixture of the meats and shells into a column of an aqueous liquid supported by the pressure of the atmosphere, raising the meats and shells in said column of aqueous liquid to a region of marked sub-atmospheric pressure, lowering the mixture of meats and shells in a column of said liquid from said region of marked sub-atmospheric pressure until the liquid is forced into said porous tissue and said shell pieces become of greater density than the meats, and allowing the meats and shells to separate in an aqueous liquid having a density intermediate that of the treated meats and shells.

6. The method of separating detached meats from shells of cracked nuts, which consists in immersing the mixed meats and shells in an aqueous liquid and flowing the same through a course having up travel, down travel and intermediate portions, subjecting the flowing liquid and the meats and shells therein to sub-atmospheric pressure in the intermediate portion of the course so as to remove air from the porous portions of the shells, increasing the hydrostatic pressure by the liquid on the meats and shells in the down travel portion of the course so as to cause liquid to be forced into the porous tissue of the shells to render the shells denser than the meats, discharging the treated meats and shells from the down travel portion of the course, and allowing the treated meats and shells to separate in an aqueous liquid of intermediate density.

7. An apparatus for separating detached meats from shells of cracked nuts, comprising a conductor for soaking the shells and having up travel, discharging down travel and intermediate portions for conveying the mixed meats and shells in an aqueous liquid through a course of removing chamber, means to withdraw air from said chamber, means for movement in said chamber to agitate said meats and shells in said chamber, and means for receiving the meats and shells discharged by the down travel portion of said conductor and separating the detached meats from the shells in a liquid having a density intermediate that of the treated meats and shells.

8. In an apparatus for separating nut meats from shells of cracked nuts, a siphon device for conveying water and meats and shells in said water to and from a summit and for creating marked sub-atmospheric pressure at said summit, a feed basin below the elevation of said summit for receiving water and meats and shells and introducing the same to the entrance of said siphon, means to supply water to said feed basin at a location and to stabilize the elevation of water therein, means to discharge meats and shells into said basin at a location horizontally intermediate of said siphon entrance and said location where water is supplied and at a horizontally spaced interval from said siphon entrance, and means to move in said interval to mix said meats and shells with the water before they enter said siphon.

9. In an apparatus for separating nut meats from shells of cracked nuts, a siphon for conveying water and meats and shells of cracked nuts in said water to and from a summit and for creating marked sub-atmospheric pressure at said summit, a feed basin at the entrance of said siphon and below the summit of said siphon for containing a horizontally elongated water bath with a horizontally elongated surface in communication with the atmosphere, said bath communicating along one end of said basin with the siphon entrance, means towards the other end of said basin to supply water to said feed basin and to stabilize the elevation of the water in the basin, and conveying means to supply meats and shells to said feed basin intermediate said siphon entrance and said water supplying and stabilizing means.

10. In an apparatus for separating nut meats from shells of cracked nuts, means for conveying water and meats and shells of cracked nuts in said water to and from a summit and for creating marked sub-atmospheric pressure at said summit, said means comprising upflow and downflow tubes, a feed basin to receive a bath of water and meats and shells of cracked nuts in said water and feed them to the entrance of said upflow tube, and means for rotating said water over and under a horizontal axis in said feed basin, thereby to mix said meats and shells with said water.

11. In an apparatus for separating nut meats from shells of cracked nuts, a siphon for carrying water and meats and shells of cracked nuts in said water to and from a summit and for creating marked sub-atmospheric pressure at said summit, a feed basin for containing water and meats and shells of cracked nuts in said water, said siphon having an inlet opening in said feed basin below the surface of the water therein, and means to move in the water in said basin for submerging buoyant meats and shells in the water in said basin that they may be carried into said siphon.

12. In an apparatus for separating nut meats from shells of cracked nuts, means for conveying water and meats and shells of cracked nuts in said water to and from a summit and for creating marked sub-atmospheric pressure at said summit, said means comprising upflow and downflow tubes, a feed basin to introduce to said upflow tube water and meats and shells in said water, and an agitator mounted to rotate horizontally in the water of said feed basin to rotate said meats and shells and water in said basin over and under said agitator.

13. In an apparatus for separating nut meats from shells of cracked nuts, a siphon for conveying water and meats and shells of cracked nuts in said water to and from a summit and for creating marked sub-atmospheric pressure at said summit, a feed basin to receive water and meats and shells of cracked nuts in said water and feed the same to said siphon, the entrance to said siphon being below the waterline of said feed basin, and means to periodically pass in front of said entrance to prevent stoppage thereof.

14. In an apparatus for separating nut meats from shells of cracked nuts, a siphon to convey water and meats and shells of cracked nuts in said water to and from a summit and for creating marked sub-atmospheric pressure at said summit, said siphon including an air removing tank in the region of its summit, suction means to remove air from said tank, and means mounted for movement to agitate said meats and shells in said tank.

15. In an apparatus for separating nut meats from shells of cracked nuts, a siphon to convey water and meats and shells of cracked nuts in said water, said siphon including an air removing tank in the region of its summit, a suction tube for removing air from said tank and having an opening communicating with said tank, and means to stabilize the waterline in said tank at a level below the opening to said suction tube regardless of changes in atmospheric pressure and minor changes in suction pressure.

16. In an apparatus for separating nut meats from shells of cracked nuts, a siphon to convey water and meats and shells of cracked nuts in said water, said siphon including an air removing tank in the region of its summit, suction means to remove air from said tank, and overflow means within the sealed system of said siphon and having an opening communicating with said tank to provide for additional outflow of water from said tank above a certain level whereby to stabilize the waterline in said tank.

17. In an apparatus for separating nut meats from shells of cracked nuts, a siphon for conveying water and nut meats and shells of cracked nuts in said water, said siphon including an enlarged chamber and upflow and downflow tubes communicating with said chamber through openings thereinto, suction means for removing air from said chamber and communicating with said chamber through an opening thereinto, a perforated partition in said chamber with the opening to said suction means on one side thereof and the openings to said upflow and downflow tubes on the other side, and means for producing alternate relative movements between said partition and the water in said chamber.

18. In an apparatus for separating nut meats from shells of cracked nuts, de-aerating apparatus for shells of cracked nuts comprising a water containing tank, a tube in said tank, said tube having an open portion above the level of the water, a baffle screen guarding said opening and having perforations of a size to permit the passage of air but restrain shells from passing therethrough, means to oscillate said tube about its axis, and means to convey through said tube water and shells to be de-aerated.

19. In an apparatus for separating nut meats from shells of cracked nuts, means for conveying water and meats and shells of cracked nuts in said water to and from a summit and for creating marked sub-atmospheric pressure at said summit, said means comprising upflow and downflow tubes, a separating basin to receive the water and meats and shells from said downflow tube, and means for separately removing non-buoyant shells from said basin as respects buoyant meats.

20. In an apparatus for separating nut meats from shells of cracked nuts, a siphon for conveying water and meats and shells of cracked nuts in said water to and from a summit of marked sub-atmospheric pressure for saturating the shells, a separating basin to receive the water and meats and shells from said siphon, and means for separately removing the buoyant meats and non-buoyant shells from said basin.

21. In an apparatus for detaching and separating nut meats from wet shells of cracked nuts, means for discharging wet meat containing shells of cracked nuts for travel along a travel course in the air in an unconsolidated and unsupported state, a beater to strike said unsupported shells in the air at a velocity greater than that of said shells, to detach meats therefrom by the impact, and a bath at a lower elevation than said beater to thereafter receive the shells and meats for separating said detached meats from said shells, said beater being so constructed and so arranged with reference to said travel course and said bath as to drive said shells downwardly directly into the liquid of said bath.

22. In an apparatus for detaching and separating nut meats from wet shells of cracked nuts, means for dropping a stream of wet meat-containing shells of cracked nuts for travel in an unconsolidated and unsupported state along a travel course through the air, hammer means to intermittently move through the travel course of said stream of unsupported shells at sufficient velocity for fracturing shell pieces by impact and detaching meats therefrom, and a bath to thereafter receive the shells and meats for separating said detached meats from said shells, said parts being so constructed and arranged that the shells and detached meats are driven directly into the liquid of said bath by the impact of said hammer means.

23. In an apparatus for detaching and separating nut meats from wet shells of cracked nuts, means for discharging wet meat-containing shells of cracked nuts for travel in an unsupported and unconsolidated state into the air, a beater to intercept and strike said unsupported shells in the air to detach meats therefrom and thereby drive the shells and detached meats into the air in a downwardly and forwardly direction, and a bath extending beneath and in front of said beater to intercept the shells and detached meats driven into the air by said beater and effect their separation.

24. In an apparatus for detaching and separating nut meats from shells of cracked nuts, a pair of baths for separating saturated shells from detached nut meats, and means for handling the saturated shells enroute from one of said baths to the other, said handling means comprising a beater for striking said shells in the air and detaching meats therefrom by the impact, and means for removing shells from the first bath, draining these shells and discharging them unsupported through the air to said beater.

25. In an apparatus for detaching and separating nut meats from shells of cracked nuts, a bath for separating saturated shells from detached nut meats, a beater for striking said shells in the air and detaching meats therefrom by impact, and means for removing shells from said bath and discharging them in an unsupported state through the air to said beater, said means comprising a perforated conveyor, the perforations of which are of a size for retaining meat containing shells and permitting water to pass through.

26. In an apparatus for detaching and separating nut meats from shells of cracked nuts, a bath, an inclined perforated endless belt to receive shells of cracked nuts from the bath, elevate and drain the shells and drop them into the air, a rotary beater to strike said shells in the air and detach meats therefrom, and to drive them downwardly underneath the return length of said belt and a second bath situated at least partly underneath said belt, for receiving said shells and separating detached meats therefrom.

27. In an apparatus for detaching and separating nut meats from shells of cracked nuts, means for conveying a stream of separating liquid, means for discharging detached meats and shells of cracked nuts into said stream, means to remove buoyant meats from said stream of liquid, means to remove non-buoyant shells from said stream of liquid, elevate and drain them and drop them back towards said stream of liquid, and a beater to intercept and strike said shells a meat detaching blow during their descent and drive them into said stream of liquid at a location farther along its course than where they were removed.

28. In an apparatus for detaching and separating nut meats from shells of cracked nuts, a series of beaters, each for intercepting and striking falling shells and by the impact detaching meats from the shells, and means for handling meats and shells enroute from one of said beaters to the next, said means comprising a separating bath to receive nut meats and shells from one of said beaters, and means to remove shells from said bath, drain the liquid therefrom and drop them to the next beater.

29. In an apparatus for detaching and separating nut meats from shells of cracked nuts, a series of conveying means for conveying, draining and discharging wet shells unsupported into the air, a series of rotary beaters, one for each of said conveying means, for intercepting the unsupported discharged shells in the air and striking the same, the first beater striking with sufficient impact to detach meats from the shells and succeeding beaters of the series striking at progressively greater speeds, each beater having hammer means spaced about an axis, the distance between said hammer means being progressively greater for the beaters operating at progressively greater speeds, and bath means for receiving the detached meats and shells from each of said beaters, separating the buoyant meats from the non-buoyant shells and depositing the wet separated shells on succeeding conveying means of the series.

30. In an apparatus for detaching and separating nut meats from shells of cracked nuts, a series of conveying elements for conveying and discharging shells unsupported into the air, a series of rotary beaters, one following each conveying element, for intercepting the unsupported discharged shells in the air and striking the same, the first beater striking with sufficient impact to detach meats from the shells and succeeding beaters of the series striking progressively harder blows, and bath means for receiving the detached meats and shells from each of said beaters, separating the meats from the shells and discharging the separated shells on a succeeding conveying element.

31. In an apparatus for detaching and separating nut meats from shells of cracked nuts, means for conveying a flowing stream of separating liquid, means for introducing detached meats and shells of cracked nuts into said stream for flow therewith, means to remove non-buoyant shells from said flowing stream of liquid, elevate them above the stream and drop them back towards said stream, and a beater to intercept and strike said shells a meat detaching blow during their descent and drive them into said stream of liquid.

32. In an apparatus for detaching and separating nut meats from shells of cracked nuts, a bath for separating buoyant nut meats from non-buoyant shells in a liquid of intermediate density, a spout for discharging from the bath a stream of liquid carrying the non-buoyant shells from the bath, an endless conveyer extending below the outlet of the spout to intercept the discharged liquid and being perforated to strain the shells from the liquid while allowing the liquid to pass through freely, the conveyer being mounted to carry the deposited shells away from the stream of liquid and there to discharge them into the air for travel along a travel course in an unsupported and unconsolidated state, and a rotary beater mounted along said travel course for striking said unsupported shells in the air to detach meats from said shells by the impact.

33. In an apparatus for detaching and separating nut meats from shells of cracked nuts, a bath for separating buoyant nut meats from non-buoyant shells in a liquid of intermediate density, means to discharge from the bath a stream of liquid carrying the non-buoyant shells from the bath and to convey it to a second separating bath, means to intercept the shells in this stream of liquid, drain them, carry them away from said stream of liquid and drop them unsupported and unconsolidated into the air, and means to intercept and strike the dropping shells with impact to detach meats from said shells and to drive said shells and detached meats directly into said second bath.

34. In an apparatus for detaching and separating nut meats from shells of cracked nuts, a beater to strike meat containing shells of cracked nuts falling through the air and detach meats therefrom by the impact, an endless conveyer mounted to discharge said meat containing shells through the air to said beater and being perforated to permit water to readily pass through it but to retain meat containing shells, means to convey through said perforated conveyer separating liquid carrying meat containing shells to said conveyer and thereby deposit said meat containing shells upon said conveyer, and a separating basin situated to receive separating liquid passing through said perforated conveyer and to also receive and separate the shells and detached meats struck by said beater.

35. The method of separating nut meats from shells of cracked nuts mixed therewith, including shell pieces which contain porous tissue and which before treatment will not sink in a chosen separating liquid in which the meats will float, which consists in immersing the mixed meats and shells in an aqueous liquid, siphoning the aqueous liquid and the meats and shells immersed therein over a high summit, and allowing the siphoned meats and shells to separate in an aqueous liquid having a density intermediate that of the siphoned meats and shells.

36. The method of separating nut meats from shells of cracked nuts mixed therewith, including shell pieces which contain porous tissue and which before treatment will not sink in a chosen separating liquid in which the meats will float, which consists in immersing the mixed meats and shells in an aqueous liquid, siphoning the aqueous liquid and the meats and shells immersed therein over a high summit, agitating the meats and shells in the liquid in the region of the summit, and allowing the siphoned meats and shells to separate in an aqueous liquid having a density intermediate that of the siphoned meats and shells.

37. The method of separating nut meats from shells of cracked nuts mixed therewith, including shell pieces which contain porous tissue and which before treatment will not sink in a chosen separating liquid in which the meats will float, which consists in immersing the mixed meats and shells in an aqueous liquid, siphoning the aqueous liquid and the meats and shells immersed therein over a high summit, maintaining the meats and shells in the region of the summit for a relatively protracted time interval in said siphoning operation, and allowing the siphoned meats and shells to separate in an aqueous liquid having a density intermediate that of the siphoned meats and shells.

38. In an apparatus for separating nut meats from shells of cracked nuts, a siphon device for conveying water and meats and shells in said water to and from a summit and for creating marked sub-atmospheric pressure at said summit, said siphon being provided with a chamber at the summit having an air removing space, suction means to remove air from said space, and for maintaining the liquid flowing through the chamber, and means for jarring air bubbles from the shells in said chamber.

39. In an apparatus for separating nut meats from shells of cracked nuts, a siphon to convey water and meats and shells of cracked nuts in said water to and from a summit and for creating marked sub-atmospheric pressure at said summit, said siphon including an air removing tank in the region of its summit, suction means to remove air from said tank, and perforate means mounted for movement to hold the meats and shells immersed in the liquid in the tank and to agitate said meats and shells in said tank.

FELIX B. ROMBERG.